UNITED STATES PATENT OFFICE.

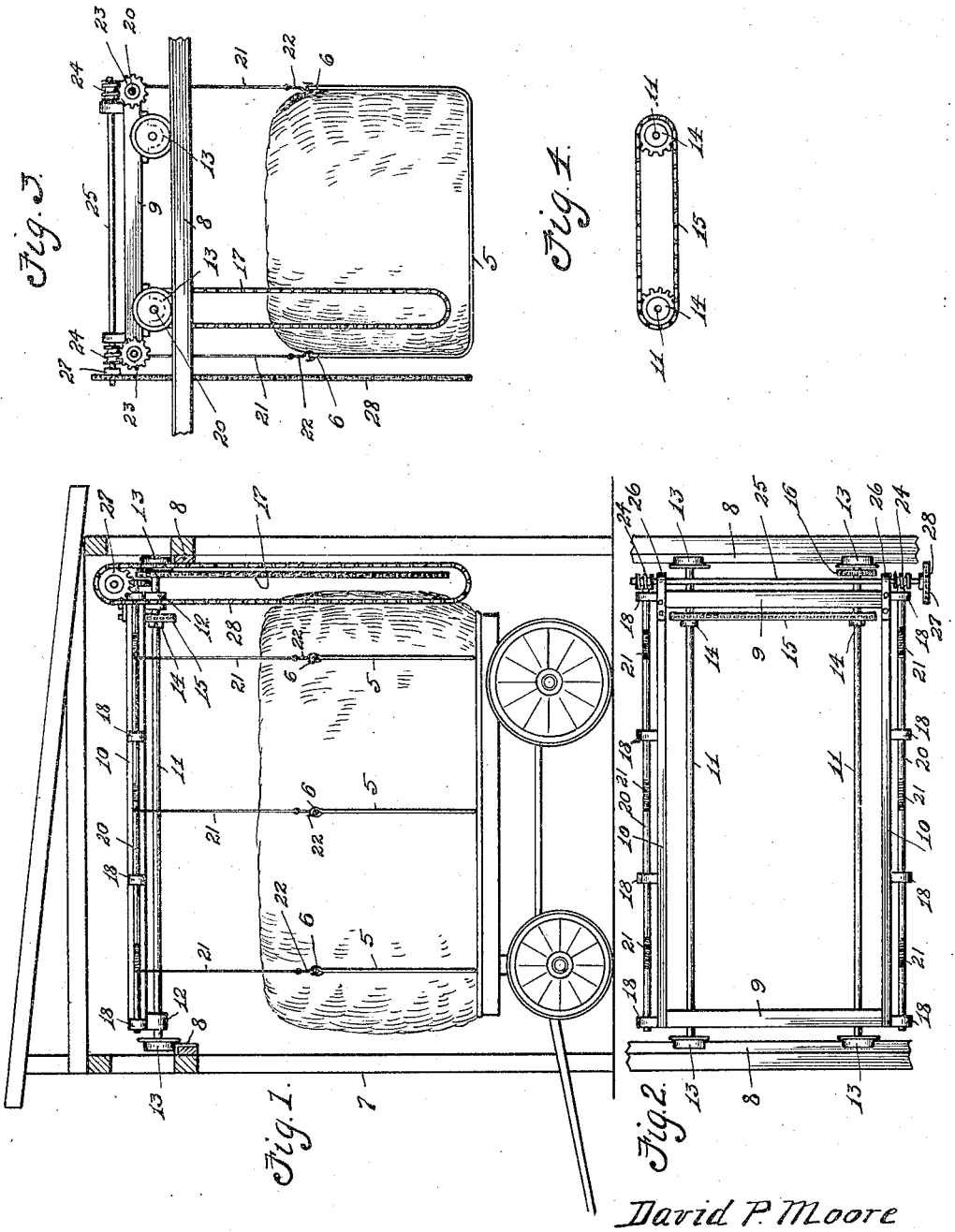

DAVID P. MOORE, OF SOUTH BEND, INDIANA.

LOADING OR UNLOADING APPARATUS.

1,330,212.

Specification of Letters Patent. Patented Feb. 10, 1920.

Application filed June 8, 1918. Serial No. 239,031.

*To all whom it may concern:*

Be it known that I, DAVID P. MOORE, a citizen of the United States, residing at South Bend, in the county of St. Joseph and State of Indiana, have invented certain new and useful Improvements in Loading or Unloading Apparatus, of which the following is a specification.

My invention relates to means adapted to facilitate and render less laborious the loading and unloading of forage crops, particularly the unloading thereof from the vehicle conveying same from the harvest field to the desired point of storage within a barn or warehouse, and for reloading the load as a whole for conveyance to market.

The object of the invention resides in the provision of means remaining intact with the load during the storage period, which means serve in part as a bail for coöperation with hoisting means, and in part as a binding or tie to prevent the load, as for example, hay, straw, corn stalks, and the like, against separation, so that the load will be maintained intact and ready for unloading and reloading as a whole. A further object resides in the provision of hoisting means particularly adapted for coöperation with the aforementioned bails or ties, by which means the load may be hoisted for loading or unloading from a vehicle, and for conveyance to a desired point of storage within a barn or warehouse.

With the above and other objects in view, as will further on appear, the invention in the preferred form of details will be described in the following specification, reference being had particularly to the accompanying drawings, in which:

Figure 1 is a transverse view of a storage shed or barn showing the application and manner of use of the invention.

Fig. 2 is a plan or top view of the hoisting apparatus.

Fig. 3 is a side elevation showing the manner of coöperation of the hoisting means and load supporting bails.

Fig. 4 is a detail showing the driving connection between the rotative carriage supporting axles.

Referring now more particularly to the accompanying drawings, the reference numerals 5 designate U-shaped bails terminally bent to form eyes 6 for a purpose presently explained, and which are preferably made of rod iron of a size to withstand considerable stresses. Said bails in practice are intended to be positioned in relative spaced relation upon the hay rack or vehicle used in conveying the products from the harvest field to the place of storage preliminary to the loading operation, so that after the vehicle is loaded, as is shown in Fig. 1, the bails will not only serve to hold the load intact, but also serve as a means for sustaining the load in hoisting the same in the loading or unloading operation, it being intended that the bails remain intact with the load while in storage, so that the load may as readily be reloaded for conveyance to market as unloaded for placement in storage.

The bails 5 are adapted for coöperation with hoisting means installed in the barn or storage shed 7, which obviously may be of any desired construction, and to the opposite walls of which and at a suitable height from the ground are fixed rails 8 extending longitudinally of the shed, for the support of a traveling carriage including hoisting means. The traveling carriage is constructed preferably in the form of a rectangular frame comprising end bars 9 and side plates 10, which frame is supported by rotative axles 11 journaled in bearings 12 on the under side of the end bars, and which axles are carried by flanged wheels 13 bearing upon the rails 8. Each axle is provided with a sprocket wheel 14, connected by a sprocket chain 15, and one of the axles is provided with a sprocket wheel 16, to which rotative movement may be imparted by means of a sprocket chain 17, so that by manipulation of the chain 17 rotative movement will be imparted to both axles for propelling the carriage to any point upon its supporting rails.

Journaled in bearings 18 on the outer sides of the side plates 10 of the carriage frame, are what I term reel-shafts 20, each of which carries a series of cables 21, the free ends of which are provided with hooks 22 adapted to engage the eyes 6 of the load supporting bails 5. Each of said reel-shafts carry at one end worm wheels 23, each meshing with a worm 24 carried by a shaft 25 journaled in bearings 26 on the carriage frame, the shaft 25 having a sprocket wheel 27 at one end adapted to be given rotative action by the manipulation of a sprocket chain 28, and by the manipulation of which, as will be apparent, rotative action will be imparted to the reel-shafts 20 for winding and unwinding all of the cables in unison.

It will be obvious that a single person may, by the use of my improved apparatus, easily and readily unload as a whole the load of hay, straw, or the like, usually considered to be a full load, for storage preliminary to marketing the same, and reload the same as a whole unassisted for conveyance to market, thus effecting a great economy in time and cost of handling such products.

Having thus described my invention, what is claimed is:

1. A device of the character described comprising a carriage, hoisting means mounted thereon including spaced parallel reel shafts, a driving connection between said reel shafts, a series of cables adapted to be wound upon the reel shafts, load carrying bails adapted for connection at their respective ends with independent cables, and means for applying power to the driving connection, whereby the respective cables will be wound and unwound at a uniform speed.

2. A device of the character described comprising a carriage, hoisting means mounted thereon including spaced parallel reel shafts, a series of cables adapted to be wound upon the reel shafts, U-shaped load carrying bails adapted for detachable connection at their respective ends with independent cables, and means for rotating the reel shafts in unison whereby the cables will be wound and unwound at a uniform speed.

In testimony whereof I affix my signature.

DAVID P. MOORE.